United States Patent Office 3,330,122
Patented July 11, 1967

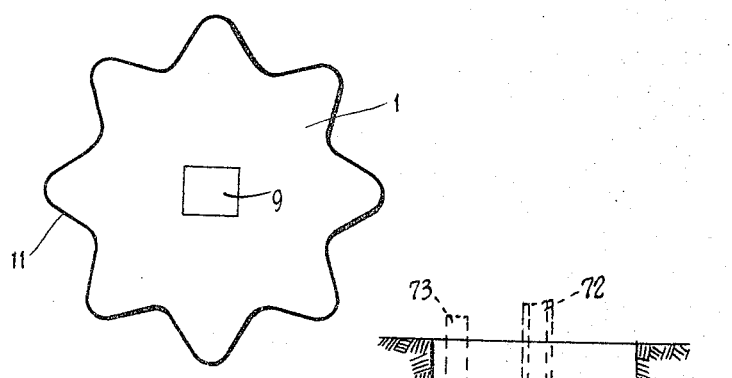
FIG. 3
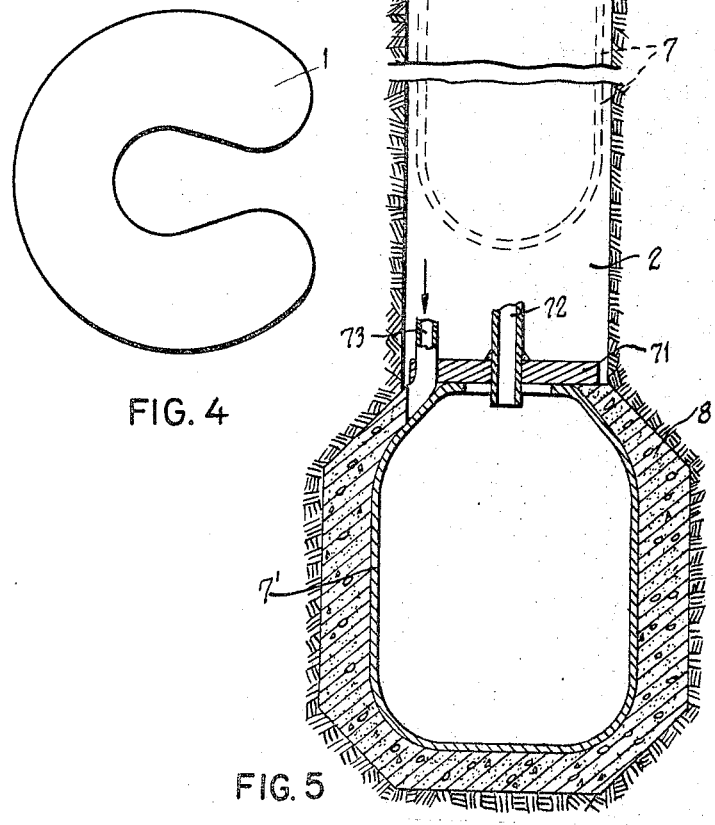
FIG. 4
FIG. 5

3,330,122
METHOD OF FORMING UNDERGROUND
NUCLEAR REACTOR INSTALLATION
Karl Janner, Erlangen, Germany, assignor to Siemens-Schuckertwerke Aktiengesellschaft, Berlin-Siemensstadt, Germany, a corporation of Germany
Filed June 4, 1963, Ser. No. 285,320
Claims priority, application Germany, June 9, 1962, S 79,863
2 Claims. (Cl. 61—46)

My invention relates to nuclear power reactor plants and more particularly to nuclear power reactors for underground installation in a drill hole or shaft.

Such underground reactors are applicable for generation of heat or electric power to be used aboveground, and have also been proposed for heating of mines or other subterraneous uses. However, the production of the large-diameter bore holes needed for accommodating such reactors becomes uneconomical, if not infeasible, at larger depths.

The dimensions of nuclear reactors, or of their reactor vessels, depend upon the possible concentration of the fissionable substance and upon the type of reactor. It can thus happen, that a particular type of reactor though suitable in principle for the desired purpose, cannot be installed if its diameter is larger than the diameter of the drill hole that is available or can be economically provided.

It is an object of my invention to overcome the above-mentioned difficulties and to devise a method and means that afford installing a nuclear-reactor vessel underground in relatively narrow drill holes or shafts.

To this end, and in accordance with a feature of my invention, the hole or shaft to receive the reactor vessel is widened only at the underground location where the vessel is to be installed, and the reactor vessel is given an expansible design so that it can be lowered through the relatively narrow shaft to the widened installation site. Thereafter, the reactor vessel is expanded by application of internal pressure to its intended width which is greater than the transverse dimension or diameter of the bore hole proper.

By virtue of the fact that the invention permits installing a reactor vessel of larger size than corresponds to the transverse dimension of the hole, the choice and design of the type of reactor most suitable for a particular purpose is no longer limited to the small diameter of a bore hole that can be economically produced. While with too small a diameter of the hole an unfavorable geometry for the reactor core would result, thus greatly limiting the available possibilities of applicable core types and designs and requiring an increase in critical mass, such limitations are largely eliminated or greatly minimized by virtue of the invention. As far as homogeneous reactors are concerned, a limitation in width of the reactor vessel and core also results in increased concentration and neutron flux density and rate of corrosion, whereas the use of a wider reactor vessel afforded by the invention also minimizes or virtually eliminates such difficulties.

As mentioned, for installing a reactor vessel of larger diameter than the bore hole, it is necessary to widen the bore hole at its base or at the intended site of the reactor. The work to be done for this purpose, however, is relatively inexpensive in comparison with sinking a hole or bore of a correspondingly larger diameter throughout. Various drilling techniques known for thus locally widening a bore hole are readily applicable for this purpose.

The expansion of the reactor vessel at the subterranean site by internal pressure is facilitated by the use of commercially available kinds of steel which have a 60% elongation in cold condition up to the breakage point and have an elongation of more than 100% in heated condition. A vessel originally of substantially cylindrical shape and consisting of such a relatively ductile material can be expanded by internal pressure to a barrel-shaped configuration. However, the particular configuration of the expanded vessel can also be predetermined by the specific shape of a previously installed reflector. The reflector material consists preferably of concrete but may also be made of metal. The desired hollow shape, which subsequently limits the expansion of the reactor vessel, can be produced by suitable mechanical machining, or preferably by pouring the concrete or other moldable material into a suitable form. One way of doing this is to pour moldable material into the pit around an elastic, for example inflatable, hollow body or to lower the hollow body into the moldable material previously poured into the pit. The inflatable or other form is then kept in place until the moldable material has hardened and can thereafter be left in place ("lost form") or be removed from the pit prior to inserting the expansible reactor vessel.

The pressure increase for expanding the reactor vessel after it has been lowered to the installation site is preferably produced by fluid pressure. For example liquid, such as water, is pumped into the vessel. The expansion can also be effected by the known explosion technique according to which a chemical propellant charge is placed into the vessel and exploded. Any other suitable means for increasing the internal pressure and expanding the vessel are also applicable.

When a reactor vessel is to be expanded to a particularly great extent, the ductility of the material may no longer be adequate to sustain the necessary elongation. In such a case it is advisable to provide the reactor vessel wall, before the vessel is installed in the drill hole, with one or more folds or pleats extending in the axial direction of the vessel; the wall being partially bent inwardly or crumpled in order to provide the reduced diameter necessary to permit insertion of the vessel into the drill hole. The expansion of the folded reactor vessel can then be effected at the installation site by the aforementioned methods.

The novel features which are considered as characteristic for the invention are set forth in particular in the appended claims. The invention itself, however, both as to its construction and its method of operation, together with additional objects and advantages thereof, will be best understood from the following detailed description of specific embodiments in connection with the accompanying drawings in which:

FIGS. 3 and 4 are diagrammatic, radially cross-sectional outlines of two modified forms of the reactor vessel; and FIG. 5 is an elevational view of a hollow body during two stages of its installation underground.

Figures 1, 2:
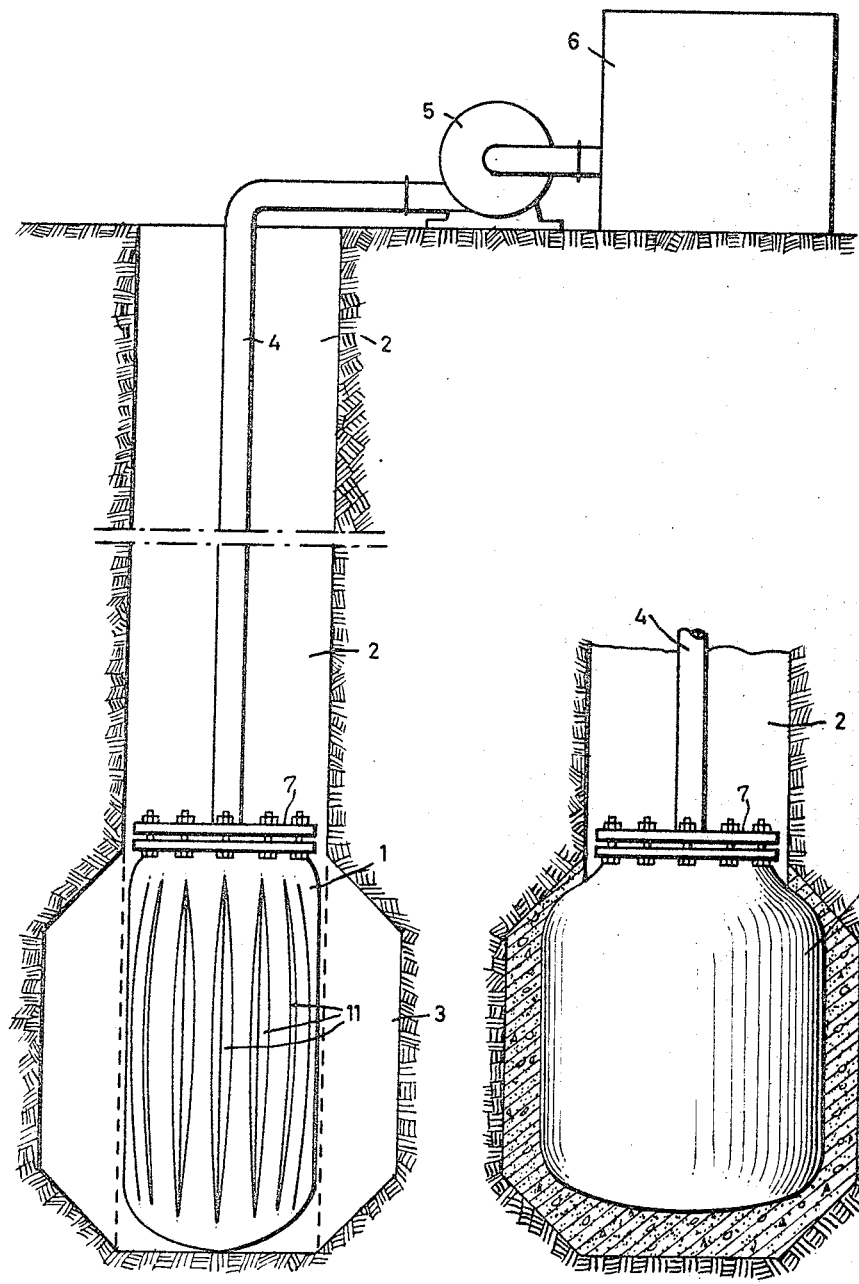
FIG. 1 is an elevational view of an underground unexpanded reactor vessel in combination with a pump and fluid source located aboveground, constructed in accordance with the invention.
FIG. 2 is a fragmentary view of FIG. 1 showing the reactor vessel in expanded condition.

FIG. 1 illustrates, by way of example, one mode of application of the expansion method forming part of the present invention. The reactor vessel 1 of sheet steel is lowered through the drill hole 2 to the bottom thereof. In this installation position of the reactor, the drill hole has a radially extending enlargement or widening 3 which may be prelined with concrete. Folds 11 are distributed over the entire peripheral surface of the reactor vessel. A pressure inlet pipe 4 is connected at one end to the cover flange 7 of the reactor vessel and at the other end to a high pressure pump 5 located aboveground. The pump 5 forces water, for example, or other suitable liquid or gas out of the container 6 into the vessel 1 so as to press the folds 11 outwardly and so that the accordingly expanded or widened vessel fills the entire hollow space 3 of the drill hole, as shown in FIG. 2.

As shown diagrammatically in FIG. 3, the reactor vessel 1 may be provided with a plurality of folds 11, or it may have a folded shape as exemplified in FIG. 4.

The thickness of the vessel wall, at least in the region where deformation takes place, need be less than would normally be required, since the previously installed form or lining of concrete which acts subsequently as the reflector, simultaneously supports the reactor vessel proper to counteract the high inner pressure thereof.

In applying the aforementioned method of widening the vessel, it is advantageous to heat the vessel to annealing temperature before lowering it or before expanding it, in order to improve its ductility. After expansion, it is also desirable to further improve the structure of the vessel material and to remove or minimize internal stresses by subjecting the vessel to one or more heating steps at the necessary temperatures to effect recovery and recrystallization thereof. For this purpose, suitable amounts of propellant charges 9, for example, can be used again to provide the necessary heating. The temperatures to which the vessel must be heated in order to anneal or stress relieve the same will depend upon the type of steel or other metal of which it is constructed and are, of course, well known to the man of ordinary skill in the art.

Particularly when installing reactors in drill holes of relatively small depth, the bores in the top wall necessary for operating the completed reactor, can be drilled after the vessel has been expanded within the drill hole, it being desirable to adapt the wall thickness of the various vessel parts beforehand to the required degrees of deformation. On the other hand, when placing the reactor at greater depths, it is preferable to provide it beforehand with the necessary bore holes and to effect a pressure-tight sealing of these bores in a suitable manner after the vessel is installed.

FIG. 5 shows an inflatable hollow body or diaphragm 7' during two stages of being installed at the installation site. A reflector layer of concrete 8 surrounds the inflatable body 7' in the lower cavity. A pipe 72 extends through a guide plate 71 at the top of the inflatable body 7' for conducting a pressure medium, such as water, for example, from the surface of the earth into the same. One or more pipes 73 can extend in addition through the plate 71 for supplying concrete or any other suitable hardenable compound material from the surface of the earth so as to fill in the cavity below the bore hole 2 in a conventional manner while the inflatable hollow body 7' supports the concrete layer 8 until it is hardened to its desired shape for receiving the reactor vessel proper. The dotted line representation in the upper part of FIG. 5 shows the assembly as it is being lowered through the relatively narrow bore hole 2, whereas the solid line representation thereof at the lower part of FIG. 5 shows the assembly in the inflated condition of the inflatable body 7' at the final installation position.

While the invention has been illustrated and described as embodied in a particular reactor for underground installation in drill holes or shafts, it is not intended to be limited to the details shown, since various modifications and structural changes may be made without departing from the spirit of the present invention and within the scope and range of equivalents of the following claims.

I claim:

1. In a method of producing a subterraneous nuclear reactor installation, the steps of sinking a hole of predetermined diameter in the ground to an installation site, enlarging the diameter of the hole at said installation site, turning inwardly at least one portion of a reactor vessel wall formed of ductile material for reducing said reactor vessel to a transverse dimension smaller than said predetermined diameter, heating said reactor vessel wall to improve its ductility, lowering said reactor vessel through said hole to said installation site, expanding said reactor vessel at said installation site to a width greater than said predetermined diameter, and heating said reactor vessel wall at least once to reduce internal stresses.

2. In a method of producing a subterraneous nuclear reactor installation, the steps of sinking a hole of predetermined diameter in the ground and forming an enlarged diameter chamber at the base of said hole, delivering a mass of moldable material, hardenable with time, through said hole to said enlarged diameter chamber, lowering an expandable hollow body of ductile material through said hole into said mass, and expanding said hollow body in said enlarged diameter chamber to a transverse dimension greater than the transverse dimension of said sunken hole so that said mass is formed around said hollow body; maintaining said hollow body in expanded condition at least until the formed mass has hardened into a nuclear reactor reflector, and removing said expanded hollow body after said reflector is former, inserting a nuclear reactor vessel formed of ductile material into said hole to said increased diameter chamber and expanding said reactor vessel to line said reflector.

References Cited

UNITED STATES PATENTS

| | | | |
|---|---|---|---|
| 961,492 | 6/1910 | Goldsborough | 61—53.6 |
| 1,296,995 | 3/1919 | Miller | 61—53.6 |
| 1,449,236 | 3/1923 | Malone | 61—53.54 |
| 1,809,013 | 6/1931 | Boardman | 220—85 |
| 2,203,978 | 6/1940 | Bertran | 61—40 |
| 2,308,479 | 1/1943 | Young | 220—85 |
| 3,064,344 | 11/1962 | Arne | 29—421 |
| 3,106,068 | 10/1963 | Beckenbauer | 61—50 |
| 3,209,546 | 10/1965 | Lawton | 61—53.6 |

FOREIGN PATENTS 292,903    7/1916    Germany.

DAVID J. WILLIAMOWSKY, *Primary Examiner.*

JACOB L. SHAPIRO, JACOB L. NACKENOFF,
*Examiners.*